(12) United States Patent
Dommaschk et al.

(10) Patent No.: US 10,181,802 B2
(45) Date of Patent: Jan. 15, 2019

(54) CONVERTER ARRANGEMENT AND METHOD FOR THE OPERATION THEREOF

(71) Applicant: SIEMENS AKTIENGESELLSCHAFT, Munich (DE)

(72) Inventors: Mike Dommaschk, Moehrendorf (DE); Wolfgang Goblirsch, Tuchenbach (DE); Alfred Habermeier, Erlangen (DE); Joerg Lang, Stadtsteinach (DE); Christian Siegl, Altdorf (DE); Tobias Wieners-Rehrmann, Neunkirchen am Brand (DE)

(73) Assignee: Siemens Aktiengesellschaft, Munich (DE)

( * ) Notice: Subject to any disclaimer, the term of this patent is extended or adjusted under 35 U.S.C. 154(b) by 15 days.

(21) Appl. No.: 15/407,442

(22) Filed: Jan. 17, 2017

(65) Prior Publication Data
US 2017/0207719 A1    Jul. 20, 2017

(30) Foreign Application Priority Data
Jan. 15, 2016 (DE) .......................... 10 2016 200 473

(51) Int. Cl.
*H02M 7/217* (2006.01)
*H02M 7/483* (2007.01)
*H04B 1/16* (2006.01)

(52) U.S. Cl.
CPC .......... *H02M 7/217* (2013.01); *H02M 7/483* (2013.01); *H02M 2007/4835* (2013.01); *H04B 1/16* (2013.01)

(58) Field of Classification Search
CPC ................................ H02M 7/217; H04B 1/06
See application file for complete search history.

(56) References Cited

U.S. PATENT DOCUMENTS

| | | |
|---|---|---|
| 6,404,143 B1 | 6/2002 | Pilz et al. |
| 6,802,615 B2 | 10/2004 | Okada |
| 2003/0214638 A1 | 11/2003 | Okada |

(Continued)

FOREIGN PATENT DOCUMENTS

| | | |
|---|---|---|
| DE | 19530643 A1 | 5/1996 |
| DE | 19530485 A1 | 2/1997 |

(Continued)

*Primary Examiner* — Adolf Berhane
*Assistant Examiner* — Bart Iliya
(74) *Attorney, Agent, or Firm* — Laurence Greenberg; Werner Stemer; Ralph Locher

(57) ABSTRACT

A converter configuration has at least one series circuit with at least two series-connected sub-modules which in each case have at least one switch and are installed in each case at a predefined electrical installation position the converter configuration. The converter configuration further has a central unit connected to the sub-modules to control the sub-modules. The sub-modules in each case have a memory in which an identifier, in particular a serial number, uniquely identifying the respective sub-module is stored. The sub-modules in each case have a control device which can forward the stored identifier to the central unit via a communication connection connecting the respective sub-module and the central unit.

15 Claims, 3 Drawing Sheets

(56) References Cited

U.S. PATENT DOCUMENTS

| | | | | |
|---|---|---|---|---|
| 2004/0113757 A1* | 6/2004 | White, II | ............... | H04B 3/56 |
| | | | | 702/62 |
| 2011/0104962 A1* | 5/2011 | Krause | ............... | B63H 21/213 |
| | | | | 440/2 |
| 2015/0162848 A1* | 6/2015 | Harnefors | ............. | H02J 3/1814 |
| | | | | 363/78 |
| 2017/0005472 A1* | 1/2017 | Son | .......................... | H02J 3/36 |

FOREIGN PATENT DOCUMENTS

| | | |
|---|---|---|
| DE | 19909646 A1 | 9/2000 |
| DE | 102011006988 A1 | 10/2012 |
| DE | 102011017597 A1 | 10/2012 |
| DE | 102014105985 A1 | 10/2015 |
| EP | 0898442 A1 | 2/1999 |
| EP | 1363451 A1 | 11/2003 |
| EP | 2884825 A1 | 6/2015 |
| WO | 2012146463 A1 | 1/2012 |
| WO | 2013178249 A1 | 12/2013 |
| WO | 2015108613 A1 | 7/2015 |

* cited by examiner

CONVERTER ARRANGEMENT AND METHOD FOR THE OPERATION THEREOF

CROSS-REFERENCE TO RELATED APPLICATION

This application claims the priority, under 35 U.S.C. § 119, of German application DE 10 2016 200 473.5, filed Jan. 15, 2016; the prior application is herewith incorporated by reference in its entirety.

BACKGROUND OF THE INVENTION

Field of the Invention

The invention relates, inter alia, to a converter arrangement.

A converter arrangement of this type is known from published, European patent application EP 2 884 825 A1 A; the arrangement contains one or more series circuits in each case with at least two series-connected sub-modules. The sub-modules in each case have at least one switch and are installed in each case at a predefined electrical installation position of the converter arrangement. The sub-modules are controlled by a central unit.

SUMMARY OF THE INVENTION

The object of the invention is to indicate a converter arrangement which enables a particularly controlled operation.

This object is achieved according to the invention by a converter arrangement with the features as claimed in the main patent claim. Advantageous designs of the converter arrangement according to the invention are indicated in the subclaims.

It is provided accordingly that the sub-modules in each case have a memory in which an identifier, in particular a serial number, uniquely identifying the respective sub-module is stored, and the sub-modules in each case have a control device which can forward the stored identifier to the central unit via a communication connection connecting the respective sub-module and the central unit.

An essential advantage of the converter arrangement according to the invention can be seen in that identifiers which in each case uniquely identify the sub-modules are allocated to the sub-modules. The identifiers are stored in a memory and enable a module-dedicated control device of the sub-modules to forward the stored identifier to the central unit. The central unit thus has the facility to query the identifiers regularly or irregularly and check whether the received identifiers match reference identifiers or previously stored identifiers. If not, the central unit may, for example, take predefined measures, such as, for example, generating warning signals or deactivating the converter arrangement.

During the checking of the identifiers, it may, for example, be established whether the converter arrangement was correctly configured before commissioning and sub-modules were actually installed at the installation positions for which they were intended. A defective configuration, for example, can therefore be identified.

Alternatively or additionally, it is possible, for example, to determine during the operation of the converter arrangement whether sub-modules have been exchanged, so that the central unit can in each case check the configuration of the converter arrangement or the equipment of the converter arrangement with sub-modules. It is thus also possible, for example, for the central unit to determine or record the operating period of sub-modules for each individual sub-module, since it can detect a sub-module exchange for each individual installation position.

The communication connection may, for example, be a wire-connected or cable-connected, for example optical or electrical, communication connection or a wireless communication connection, in particular a radio link.

It is regarded as particularly advantageous if the control devices of the sub-modules are configured in each case in such a way that, when prompted by the central unit, they forward the identifier of their sub-module to the central unit. With such a design of the control devices, the central unit is able to query the identifiers at all times and check the configuration of the converter arrangement in terms of the equipment with sub-modules.

In addition, it is regarded as advantageous if the control devices of the sub-modules are configured in each case in such a way that, following each recommissioning, they forward the identifier of their sub-module to the central unit in each case independently and unprompted and/or prompted by the central unit. With this design, the central unit can check in each case after each recommissioning whether the intended configuration of the converter arrangement is actually present or a discrepancy has occurred.

With regard to the design of the central unit, it is regarded as advantageous if the central unit has a memory in which it stores the received identifiers of the sub-modules of the converter arrangement for each individual installation position.

In addition, it is regarded as advantageous if the central unit has a monitoring device which, following the initial commissioning of the converter arrangement or following each system restart of the converter arrangement, receives, in particular queries, the identifiers of the sub-modules for each electrical installation position, compares the received identifiers with reference identifiers which have been manually or automatically recorded for each installation position and have been stored in a reference dataset, and, in the event of a discrepancy between the received identifiers and the reference identifier stored for the respective electrical installation position, generates error information, for example in the form of an error signal.

Alternatively or additionally, it can be provided that the monitoring device is configured in such a way that, on receiving each identifier, it compares the identifier with the identifier previously stored for the respective electrical installation position, and, in the event of a discrepancy, stores the new identifier and generates sub-module exchange information indicating a sub-module exchange, for example in the form of a sub-module exchange information signal.

It is also possible to configure the monitoring device in such a way that, on receiving an identifier of a sub-module for the first time, it generates a timestamp, referred to below as an activation timestamp, which indicates the reception of the identifier and therefore the initial commissioning of the sub-module in the converter arrangement, and stores the activation timestamp and the identifier for each individual installation position.

It is also advantageous if the central unit is configured in such a way that, using the activation timestamp, it monitors the individual sub-modules in each case on an individual sub-module basis to determine whether they have reached a predefined maximum operating time and, for the purpose of initiating a module exchange or module maintenance on reaching the maximum operating time, generates operating time warning information, in particular an operating time warning signal, in each case for each individual sub-module.

With a view to recording operating times of the individual sub-modules, it is regarded as advantageous if the central unit, in particular a monitoring device of the central unit, is configured in such a way that, if it receives a new identifier for an installation position, it stores the identifier of the recommissioned sub-module for the respective installation position and the associated activation timestamp and retains the identifier of the previously active sub-module and its activation timestamp.

It is particularly advantageous if the central unit, in particular a monitoring unit of the central unit, stores a historical dataset which in each case contains, for each installation position, the identifier of the sub-module currently in operation and its activation timestamp and the identifiers and activation timestamps of all sub-modules that were previously in operation for the respective installation position.

The central unit preferably enables an external querying of the historical dataset from outside.

With a view to recording operating times, it is regarded as advantageous if the central unit, in particular a monitoring device of the central unit, enables an external querying of the operating times of the individual sub-modules and, in the presence of an external query signal, outputs an operating time indication, in particular an operating hours indication, indicating the respective operating time using the identifiers stored for each individual installation position and the activation timestamps stored for each individual installation position for each of the sub-modules or for the sub-modules selected with the external query signal.

The central unit preferably has a processing device and a memory in which a monitoring program module is stored, wherein the monitoring program module is configured in such a way that the processing device forms the aforementioned monitoring device when the monitoring program module is executed.

The invention additionally relates to a method for operating a converter arrangement which has at least one series circuit with at least two series-connected sub-modules which in each case have at least one switch and are installed in each case at a predefined electrical installation position of the converter arrangement, and a central unit.

In respect of a method of this type, it is provided according to the invention that an identifier, in particular a serial number, uniquely identifying the respective sub-module is stored in each case in a memory of the sub-modules, and the stored identifiers of the sub-modules are forwarded in each case to the central unit via a communication connection (e.g. wire-connected or cable-connected, optical or electrical, or wireless, for example via a radio link) connecting the respective sub-module to the central unit.

With regard to the advantages of the method according to the invention, reference is made to the details set out above in connection with the converter arrangement according to the invention.

With regard to the method, it is regarded as particularly advantageous if, following the initial commissioning or following a system restart, the central unit receives, in particular queries, the identifiers of the sub-modules for each electrical installation position, compares the received identifiers for each individual installation position with reference identifiers which have previously been manually or automatically recorded and stored in a reference dataset for each installation position of the converter arrangement and, in the event of a discrepancy between a received identifier and the reference identifier stored for the respective electrical installation position, generates error information.

In addition, it is advantageous if the central unit, on receiving an identifier of a sub-module for the first time, generates a timestamp, referred to below as an activation timestamp, which indicates the reception of the identifier and therefore the initial commissioning of the sub-module in the converter arrangement, and stores the activation timestamp and the identifier for each individual installation position, if the central unit receives a new identifier for an installation position. The identifier of the recommissioned sub-module and the associated activation timestamp are stored for the respective installation position and the identifier of the previously operated sub-module and its activation timestamp remain stored and a historical dataset is generated and kept updated, in each case containing, for each installation position, the identifier of the sub-module currently in operation and its activation timestamp and the identifiers and activation timestamps of all sub-modules that were previously in operation for the respective installation position.

In addition, the invention relates to a sub-module for use in a converter arrangement as described above. According to the invention, it is provided that the sub-module has a memory in which an identifier, in particular a serial number, uniquely identifying the respective sub-module is stored, and the sub-module has a control device which can forward the stored identifier to the central unit via a communication connection connecting the sub-module and a higher-order central unit.

With regard to the advantages of a sub-module of this type, reference is made to the details set out above in connection with the converter arrangement according to the invention.

Other features which are considered as characteristic for the invention are set forth in the appended claims.

Although the invention is illustrated and described herein as embodied in a converter arrangement and a method for the operation thereof, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

For the sake of clarity, the same reference numbers are always used in the figures for identical or comparable components.

Figure 1:
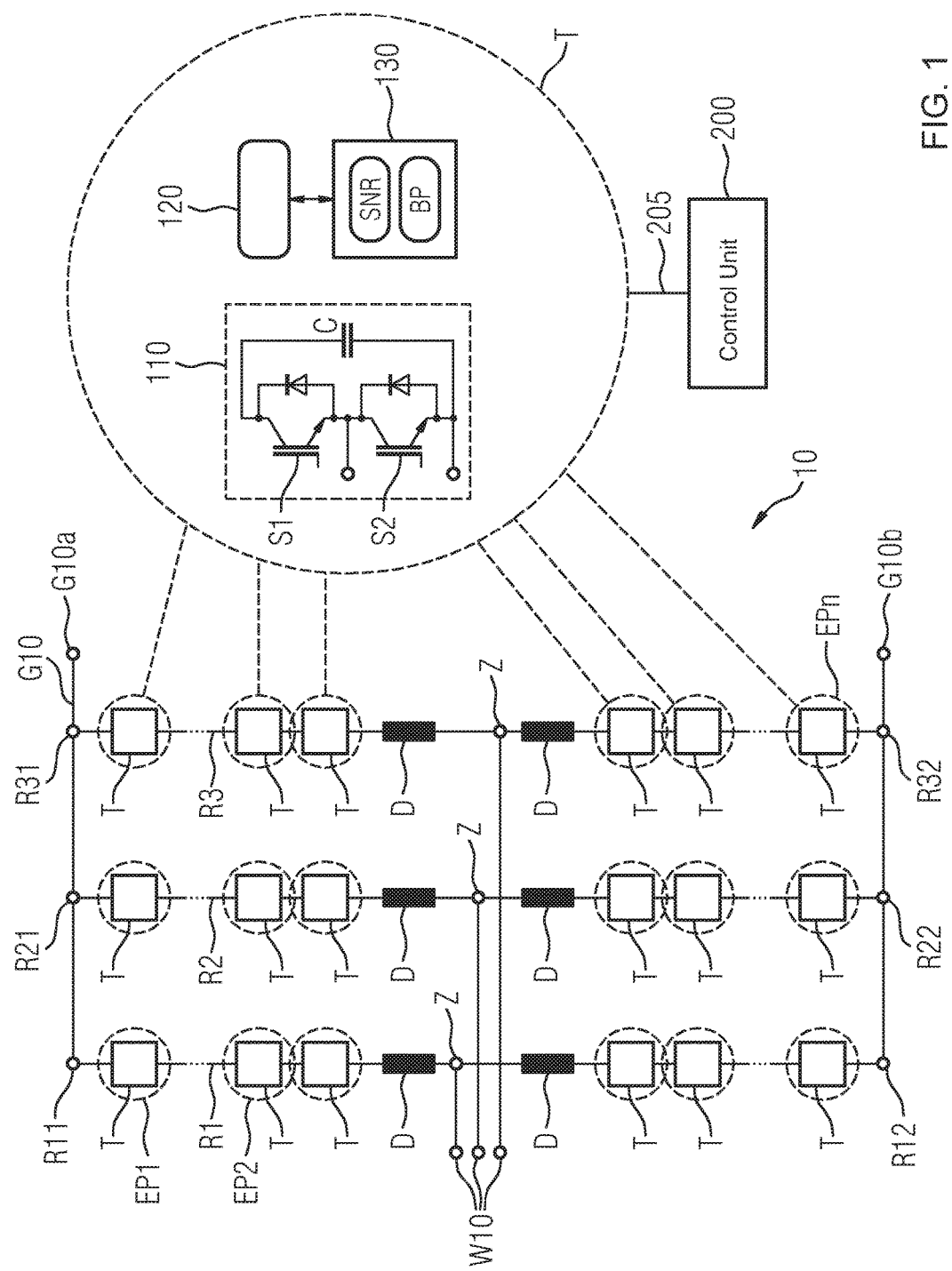
FIG. 1 is a schematic diagram showing an example embodiment of a converter arrangement according to the invention.

Referring now to the figures of the drawings in detail and first, particularly to FIG. 1 thereof, there is shown an example embodiment of a three-phase converter arrangement 10. This arrangement contains AC voltage connections W10 for the feed-in of alternating current. In addition, it is equipped with a DC voltage side G10 which contains two DC voltage connections G10a and G10b.

The converter arrangement 10 has three parallel-connected series circuits R1, R2 and R3, of which the outer connections R11, R21 and R31 are connected to the DC voltage connection G10a. The outer connections R12, R22 and R32 are connected to the DC voltage connection G10b of the DC voltage side G10. In other words, the outer connections of the three series circuits R1, R2 and R3 thus form the DC voltage side G10 of the converter arrangement 10.

In the example embodiment according to FIG. 1, each of the three series circuits R1, R2 and R3 is equipped in each case with six series-connected sub-modules T and two inductors D. An intermediate connection Z, which is located in terms of potential between the upper three sub-modules in FIG. 1 and the lower three sub-modules in FIG. 1 and forms one of the three AC voltage connections W10 of the converter arrangement 10 is located in each case between the two inductors D.

The local or physical installation positions of the sub-modules T are marked in FIG. 1 with reference numbers EP1, EP2, . . . , EPn.

In addition, FIG. 1 shows a possible structure for the sub-modules T. In the example embodiment according to FIG. 1, each of the sub-modules T in each case has a switching unit 110 with two switches S1 and S2, which form a half-bridge, and a capacitor C. Alternatively, the switching units 110 may also have four switches which form a full bridge.

The switches S1 and S2 are preferably controlled by a central unit 200, either directly or indirectly with the incorporation of a module-dedicated control device 120. If electrical energy is to be stored in the capacitor C, the switches S1 and S2 are controlled in such a way that energy flows in the direction of the capacitor C; if electrical energy is to be removed from the capacitor C, the switches S1 and S2 are controlled accordingly in such a way that energy flows in the direction of the respective series circuit R1, R2 or R3.

In the sub-modules T, the module-dedicated control device 120 is connected in each case to a module-dedicated memory 130 in which an identifier in the form of a serial number SNR uniquely identifying the respective sub-module T is stored.

The control devices 120 of the sub-modules T are preferably configured in each case in such a way that, when prompted by the central unit 200, they forward their serial number SNR in each case to the central unit 200. In the example embodiment according to FIG. 1, a communication connection 205 is provided for the forwarding.

The control devices 120 of the sub-modules T are furthermore preferably configured in each case in such a way that, after each recommissioning, they forward their serial number to the central unit 200, either independently and unprompted, or, alternatively, prompted by the central unit 200.

The control devices 120 may be formed by processing devices which, following programming by an operating program BP, turn the processing devices into the described module-dedicated control devices. The operating program BP may be stored, for example, in the module-dedicated memory 130 or in a different memory of the respective sub-module T.

Figure 2:
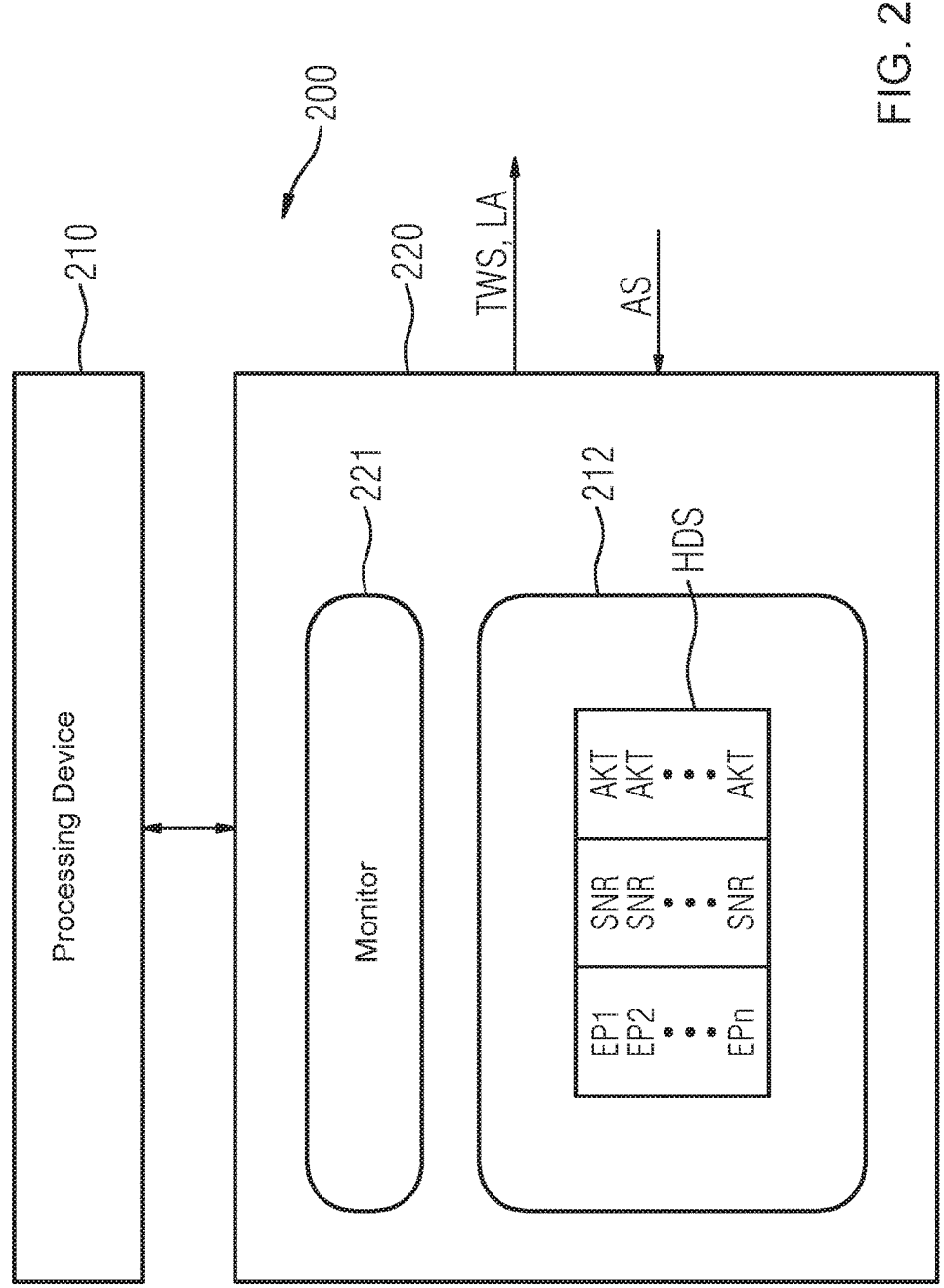
FIG. 2 is an illustration showing an example embodiment for a central unit for the converter arrangement according to FIG. 1.

FIG. 2 shows an example embodiment of the central unit 200 of the converter arrangement 10 according to FIG. 1 in more detail. The central unit 200 contains a processing device 210 and memory 220.

A monitoring program module 221 which is stored in the memory 220, following execution by the processing device 210, programs the latter in such a way that the processing device 210 performs the function of a monitoring device for the sub-modules T of the converter device 10 according FIG. 1.

In addition, a memory area 212 in which the central unit 200 stores the received serial numbers SNR of the sub-modules T according to FIG. 1 for each individual installation position is provided in the memory 220. The storage may be implemented, for example, in the form of a table in which the serial number SNR of the respective sub-module T and preferably an activation timestamp AKT are recorded for each installation position EP1, EP2, . . . , EPn. The activation timestamps AKT in each case indicate the initial reception of the respective serial number SNR of the respective sub-module T for the respective installation position and therefore also the initial commissioning of each sub-module T in the converter arrangement 10 according to FIG. 1 for each individual installation position.

It is particularly advantageous if the central unit 200, in the case where it receives a new serial number SNR for an installation position, additionally stores the serial number SNR of the recommissioned sub-module T and the time of the respective activation in the form of an activation timestamp AKT for the respective installation position. In other words, in the case of a design of this type, a type of historical dataset HDS is therefore stored in the memory area 212, in each case containing, for each installation position, the respective serial number of the sub-module T currently in operation and its activation timestamp, and also the serial numbers and activation timestamps of all sub-modules T that were previously in operation for the respective installation position.

The monitoring program module 221 and therefore the central unit 200 as a whole is preferably configured in such a way that it queries the serial numbers of the sub-modules T regularly or irregularly and, on receiving each serial number, compares it with the serial number previously stored for the respective electrical installation position and, in the event of a discrepancy, stores the new serial number and generates sub-module exchange information, for example in the form of a sub-module exchange signal TWS, indicating a sub-module exchange.

In addition, the central unit 200 and its monitoring program module 221 are preferably configured in such a way that the central unit 200 enables an external querying of the operating times of the individual sub-modules T and, in the presence of an external query signal AS, using the serial numbers SNR stored for each individual installation position and the activation timestamps AKT stored for each individual installation position for each of the sub-modules T or for the sub-modules selected with the external query signal AS, in each case outputs an operating time indication LA, in particular, for example, in the form of an operating hours indication, which indicates the respective operating time of the sub-module T.

Figure 3:
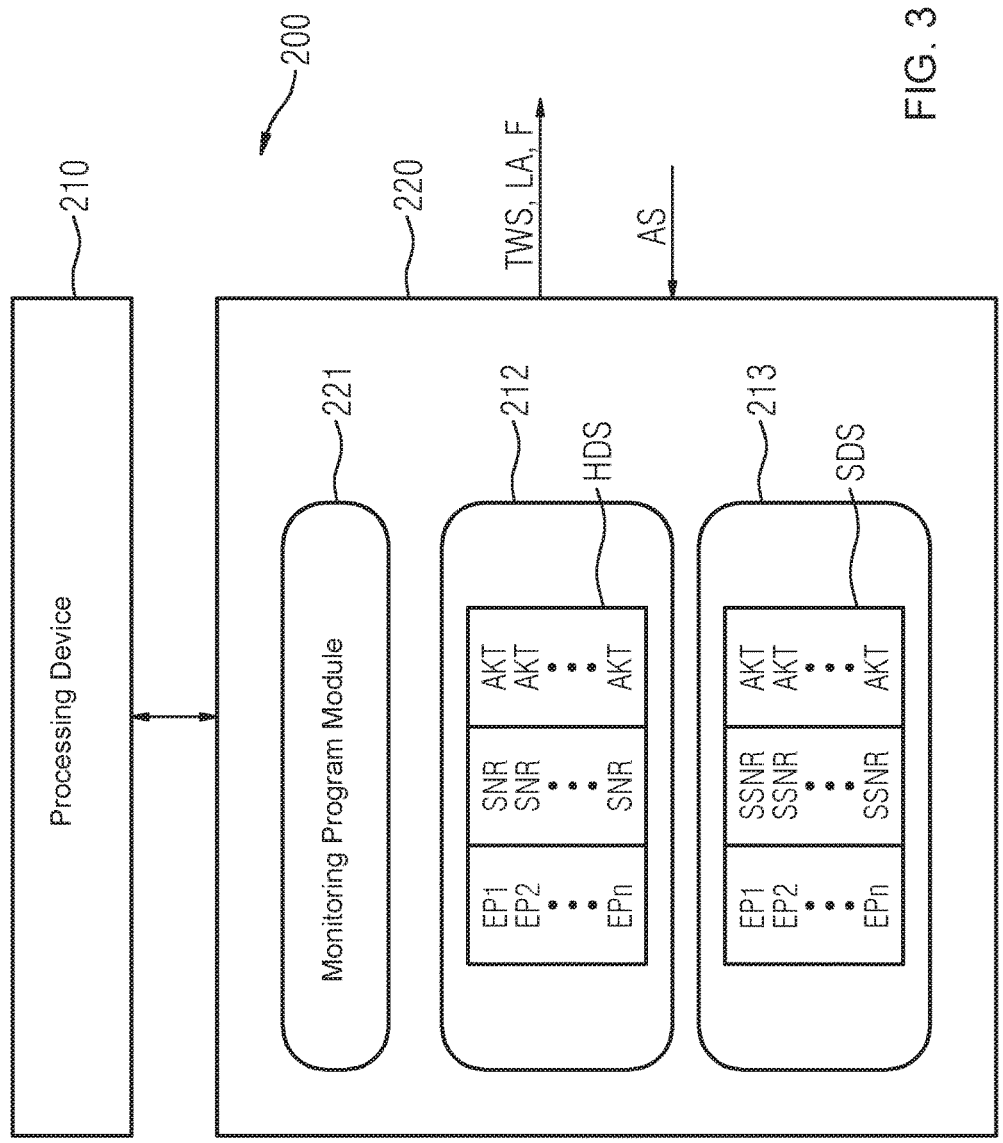
FIG. 3 is an illustration showing a further example embodiment of a central unit for the converter arrangement according to FIG. 1.

FIG. 3 shows a further example embodiment of a central unit 200 which is suitable for controlling the sub-modules T of the converter arrangement 10 according to FIG. 1. The central unit 200 has a memory 220 in which a further memory area 213 is provided in addition to the monitoring program module 221 and the memory area 212. A reference dataset SDS can be stored in the further memory area 213. For each installation position of the converter arrangement 10 according to FIG. 1, the reference dataset SDS in each case indicates a reference identifier in the form of a reference serial number SSNR which the sub-module T installed at the respective electrical installation position should have during the initial commissioning, according to a predefined installation plan or a previously undertaken recording of the installation situation. The reference serial numbers SSNR may, for example, have been manually or automatically recorded for each installation position before the initial commissioning.

The central unit 200 or the computing device 210 programmed by the monitoring program module 221 queries the identifiers of the sub-modules T for each electrical installation position preferably after or during the initial commissioning of the converter arrangement 10 or after each system restart of the converter arrangement 10 according to FIG. 1 and compares the received serial numbers with the reference serial numbers SSNR which are stored in the reference dataset SDS. If the central unit 200 determines a discrepancy between the received serial numbers and the reference serial numbers stored for the respective electrical installation position, it generates error information, for example in the form of an error signal F.

Although the invention has been illustrated and described in more detail through preferred example embodiments, the invention is not limited by the disclosed examples and other variations may be derived herefrom by the person skilled in the art without exceeding the protective scope of the invention.

The following is a summary list of reference numerals and the corresponding structure used in the above description of the invention:

10 Converter arrangement
110 Switching unit
120 Control device
130 Memory
200 Central unit
205 Communication connection
210 Processing device
212 Memory area
213 Memory area
220 Memory
221 Monitoring program module
AKT Activation timestamp
AS Query signal
BP Operating program
C Capacitor
D Inductor
EP1 Installation position
EP2 Installation position
EPn Installation position
F Error signal
G10 DC voltage side
G10a, G10b DC voltage connection
HDS Historical dataset
LA Operating time indication
R1, R2, R3 Series circuit
R11, R21, R31 External connection
R12, R22, R32 External connection
S1, S2 Switch
SDS Reference dataset
SNR Serial number
SSNR Reference serial number
T Sub-module
TWS Sub-module exchange signal
W10 AC voltage connection
Z Intermediate connection

The invention claimed is:

1. A converter configuration, comprising:
a central unit;
at least one series circuit having at least two series-connected sub-modules which in each case have at least one switch and are installed in each case at a predefined electrical installation position of the converter configuration, said central unit connected to said sub-modules to control said sub-modules, said sub-modules in each case further having a memory in which an identifier uniquely identifying a respective sub-module, is stored, and said sub-modules in each case additionally having a control device which can forward a stored identifier to said central unit via a communication connection connecting said respective sub-module and said central unit; and
said central unit including a monitoring device which, on receiving the identifier of one of said sub-modules for a first time, generates an activation timestamp that indicates a reception of the identifier and therefore an initial commissioning of said one of said sub-modules in the converter configuration, and stores the activation timestamp and the identifier for each said predefined electrical installation position.

2. The converter configuration according to claim 1, wherein said control device of each of said sub-modules is configured in each case in such a way that, when prompted by said central unit, said control device forwards the identifier of said respective sub-module to said central unit.

3. The converter configuration according to claim 1, wherein said control device of each of said sub-modules is configured in each case in such a way that, following each recommissioning, said control device forwards the identifier of said respective sub-module to said central unit in each case independently and unprompted, or prompted by said central unit.

4. The converter configuration according to claim 1, wherein said central unit has a memory in which said central unit stores identifiers of said sub-modules of the converter configuration for each said predefined electrical installation position.

5. The converter configuration according to claim 1, wherein said central unit has a monitoring device which, following an initial commissioning of the converter configuration or following a system restart of the converter configuration, receives identifiers of said sub-modules for each said predefined electrical installation position, compares the identifiers received with reference identifiers which have been manually or automatically recorded and stored in a reference dataset for each said predefined electrical installation position, and, in the event of a discrepancy between the identifiers received and a reference identifier stored for each said predefined electrical installation position, generates error information.

6. The converter configuration according to claim 1, wherein said central unit has a monitoring device, which, on receiving each said identifier, compares the identifier with the identifier previously stored for the predefined electrical installation position and, in an event of a discrepancy, stores a new identifier and generates sub-module exchange information indicating a sub-module exchange.

7. The converter configuration according to claim 1, wherein said central unit is configured in such a way that, if said central unit receives a new identifier for the predefined electrical installation position, said central unit stores the identifier of a recommissioned sub-module and an associated activation timestamp for the predefined electrical installation position and retains the identifier of a previously active sub-module and an associated activation timestamp.

8. The converter configuration according to claim 1, wherein said central unit stores a historical dataset in each case containing, for each said predefined electrical installation position, the identifier of one of said sub-modules currently in operation and an activation timestamp, and also identifiers and activation timestamps of all said sub-modules that were previously in operation for said predefined electrical installation position.

9. The converter configuration according to claim 1, wherein said central unit enables an external querying of operating times of individual ones of said sub-modules and, in a presence of an external query signal, outputs an operating time indication indicating a respective operating time using identifiers stored for each individual installation position and activation timestamps stored for each said predefined electrical installation position for each of said sub-modules or for said sub-modules selected with the external query signal.

10. The converter configuration according to claim 1, wherein said central unit has a processing device and a memory in which a monitoring program module is stored, wherein the monitoring program module is configured in such a way that said processing device forms a monitoring device when the monitoring program module is executed.

11. A method for operating a converter configuration having at least one series circuit with at least two series-connected sub-modules which in each case have at least one switch and are installed in each case at a predefined electrical installation position of the converter configuration, and a central unit, which comprises the steps of:
   storing an identifier uniquely identifying a sub-module in each case in a memory of the sub-modules;
   forwarding stored identifiers of the sub-modules in each case to the central unit via a communication connection connecting a respective sub-module to the central unit;
   generating an activation timestamp when the central unit receives the identifier of the sub-module for a first time, the activation timestamp indicating a reception of the identifier and therefore an initial commissioning of the sub-module in the converter configuration; and
   storing the activation timestamp and the identifier for each of the predefined electrical installation position.

12. The method of claim 11, wherein the sub-module comprises:
   a memory storing an identifier uniquely identifying the sub-module; and
   a control device which can forward a stored identifier to the central unit via the communication connection connecting the sub-module and the central unit.

13. The method according to claim 11, wherein the identified is a serial number.

14. The method according to claim 11, which further comprises:
   following an initial commissioning or following a system restart, the central unit receives the stored identifiers of the sub-modules for predefined electrical installation positions;
   comparing, via the central unit, received identifiers for each of the electrical installation positions with reference identifiers which have previously been manually or automatically recorded and stored in a reference dataset for each of the predefined electrical installation positions of the converter configuration; and
   generating error information in an event of a discrepancy between a received identifier and a reference identifier stored for the predefined electrical installation position.

15. The method according to claim 14, which further comprises:
   if the central unit receives a new identifier for a respective predefined electrical installation position, storing the identifier of a recommissioned sub-module and an associated activation timestamp for the respective predefined electrical installation position and the identifier of a previously operated sub-module and an activation timestamp remain stored; and
   generating a historical dataset keeping the historical dataset updated, in each case containing, for each of the predefined electrical installation positions, the identifier of the sub-module currently in operation and the activation timestamp and identifiers and activation timestamps of all sub-modules that were previously in operation for the respective installation position.

* * * * *